US007088288B1

(12) United States Patent
Margolese et al.

(10) Patent No.: US 7,088,288 B1
(45) Date of Patent: Aug. 8, 2006

(54) METHOD AND CIRCUIT FOR CONTROLLING AN ANTENNA SYSTEM

(75) Inventors: Michael A. Margolese, Campbell, CA (US); James A. Watson, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 10/340,006

(22) Filed: Jan. 10, 2003

(51) Int. Cl.
*H01Q 3/00* (2006.01)
*H04M 1/00* (2006.01)

(52) U.S. Cl. .................................... 342/377; 455/562.1

(58) Field of Classification Search ................ 342/377, 342/371, 372; 455/562.1
See application file for complete search history.

(56) References Cited

U.S. PATENT DOCUMENTS

| | | | | |
|---|---|---|---|---|
| 5,327,143 | A * | 7/1994 | Goetz et al. | 342/382 |
| 5,818,385 | A * | 10/1998 | Bartholomew | 342/372 |
| 5,917,447 | A * | 6/1999 | Wang et al. | 342/383 |
| 6,009,124 | A | 12/1999 | Smith et al. | |
| 6,094,167 | A | 7/2000 | Fuhl et al. | |
| 6,177,906 | B1 | 1/2001 | Petrus | |
| 6,236,849 | B1 | 5/2001 | Reudink et al. | |
| 6,512,481 | B1 * | 1/2003 | Velazquez et al. | 342/367 |
| 6,549,529 | B1 * | 4/2003 | Drabeck et al. | 370/347 |
| 6,590,546 | B1 * | 7/2003 | Heinz et al. | 343/853 |
| 6,801,788 | B1 * | 10/2004 | Csapo et al. | 455/561 |
| 2002/0147032 | A1 * | 10/2002 | Yoon et al. | 455/562 |
| 2002/0187813 | A1 * | 12/2002 | Guo | 455/562 |
| 2003/0100343 | A1 * | 5/2003 | Zourntos et al. | 455/562 |
| 2003/0109285 | A1 * | 6/2003 | Reed et al. | 455/562 |

FOREIGN PATENT DOCUMENTS

| | | | |
|---|---|---|---|
| GB | 2328581 | A * | 2/1999 |
| GB | 2354674 | A * | 3/2001 |

OTHER PUBLICATIONS

Web ProForum Tutorials; "Smart Antenna Systems"; Copyright the International Engineering Consortium' available at http://www.iec.org; pp. 1-29.

* cited by examiner

*Primary Examiner*—Gregory C. Issing
(74) *Attorney, Agent, or Firm*—John J. King

(57) ABSTRACT

A method of controlling an antenna system of a wireless communication network having a plurality of cells is disclosed. The method comprises the steps of determining antenna weights to enable communication between a wireless communication network and the wireless communication device within the wireless communication network; storing the antenna weights in a programmable memory associated with the wireless communication network; and providing predetermined stored antenna weights to the antenna system based upon a location of the wireless communication device. A circuit and wireless communication network for controlling an antenna system are also disclosed.

45 Claims, 5 Drawing Sheets

METHOD AND CIRCUIT FOR CONTROLLING AN ANTENNA SYSTEM

FIELD OF THE INVENTION

This invention relates generally to wireless communications circuits, base stations and systems, and in particular, to a method and circuit for controlling an antenna system of a wireless communication network.

BACKGROUND OF THE INVENTION

As wireless communication networks continue to evolve, the number of users continues to grow dramatically. Such growth of users has required service providers to expand their networks and provide greater capacity to accommodate the additional users. One way that service providers have increased capacity is by dividing the "cells" of a cellular communication networks, for example, into smaller cells or sectors. As the number of sectors increases, additional base stations are required.

Further, additional frequency has been allocated for service providers to provide wireless communication services. For example, additional spectrum has been allocated in the 2 GHz range in the United States, commonly referred to as personal communication services (PCS) spectrum. However, wireless communication networks operating in the PCS frequency spectrum, which is higher than the 800 MHz spectrum for conventional cellular service, generally require additional base stations to provide service at the higher frequency. That is, a greater number of base stations are required in a given geographic region to accommodate the same number of users as a conventional 800 MHz cellular system because the base stations must be positioned closer to one another. Accordingly, as wireless communication networks have continued to expand, the number of cell cites and base stations have also continued to expand.

Further, as wireless communication networks continue to expand and the number of base stations increases, the accessibility of base stations for routine maintenance and updating of information becomes more challenging. Modifying or altering software at base stations can be a time consuming and often a difficult task for an operator.

With an increasing number of users on a given wireless communication network, there is a greater chance for interference between users. Also, users are often faced with the problems associated with multi-path interference. Multi-path interference, generally from an unwanted reflected signal such as a signal reflected off a building, leads to a received signal which does not match in phase. When the waves of the multi-path signal are out of phase, reduction in signal strength can occur, which is commonly known as "rayleigh fading" or "fast fading." Other problems associated with multi-path signals include phase cancellation, delay spread, co-channel interference, etc.

One way to overcome interference in a wireless communication network is to provide an adaptive antenna system. Adaptive antenna systems, such as switched beam or adaptive array antenna systems, greatly improve the signal-to-noise ratio compared to a conventional omni-directional antenna used in a wireless communication network. Although wireless communication devices typically employ conventional omni-directional antennas, wireless communication networks typically employ antenna systems having an arrays of antennas adapted to receive signals from a plurality of wireless communication devices. For example, sectorized antenna systems subdivide an area of a cellular communication network into sectors using directional antennas. Each sector is treated as a different cell, which greatly increases the reuse of a frequency channel and reduces interference in the cellular communication network.

Switched beam arrays, which are well known in the art, accommodate a finite number of fixed, predetermined patterns. That is, a switched beam array antenna system forms multiple fixed beams with heighten sensitivity in predetermined directions. These antenna systems typically detect signal strength and choose from one of several predetermined fixed beams as the mobile moves throughout the sector.

In contrast, adaptive array antenna systems accommodate an infinite number of patterns that are adjusted in real time. Adaptive array antenna systems use signal processing algorithms and take advantage of the ability to effectively locate and track various signals to dynamically minimize interference and maximize intended signal reception. In particular, adaptive array antenna systems use control systems that continuously refocus the transmit lobe of the array so that the user is centered in the beam.

Adaptive array antenna systems offer excellent performance, but at the cost of significant compute power. A control system for an adaptive antenna array system, even though it may be implemented in digital logic, must enable beam focusing across precise coordinates of the wireless communication device in the wireless communication network. The compute power requirements either constrain the capability of an antenna system to support multiple users, or more likely increase the cost and complexity of the system by significantly increasing the processing requirements.

Accordingly, there is a need for an improved method of controlling an antenna system of a wireless communication network.

There is also a need for an improved method of maintaining an adaptive antenna system of a wireless communication network from a remote location.

There is a further need for an improved wireless communication circuit and network for controlling an adaptive antenna.

Finally, there is a need for communication network having an adoptive antenna system which can be controlled remotely.

SUMMARY OF THE INVENTION

The present invention relates to a method of controlling an antenna system of a wireless communication network having a plurality of cells. The method comprises steps of determining antenna weights to enable communication between a wireless communication network and the wireless communication device; storing the antenna weights in a programmable memory associated with the wireless communication network; and providing predetermined stored antenna weights to the antenna system based upon a location of the wireless communication device.

The present invention also relates to a method of controlling an antenna system of a wireless communication network by providing or updating antenna weights from a remote location. The method comprises steps of determining antenna weights to apply to the antenna system when a wireless communication device is within a cell of the plurality of cells; providing antenna weights to a base station of the wireless communication network from a location remote from the base station; and storing the antenna weights in the wireless communication network.

The present invention is also directed to a method of operating a wireless communication system having an adaptive antenna system and a plurality of cells. The method comprises steps of dividing a cell of the wireless communication network into a plurality of sectors; storing antenna weights associated with each sector of the plurality of sectors in a programmable memory of the wireless communication network; determining a sector within which a wireless communication device is located; and providing predetermined antenna weights to the antenna system depending upon the sector within which the wireless communication device is located.

Finally, a circuit for controlling an antenna system is described. The circuit comprises a controller; a programmable memory coupled to the controller and storing antenna weights; a location circuit receiving location information from a wireless communication device; and a modulator/demodulator coupled to the memory and receiving antenna weights.

DESCRIPTION OF THE PREFERRED EMBODIMENTS

Figure 1:
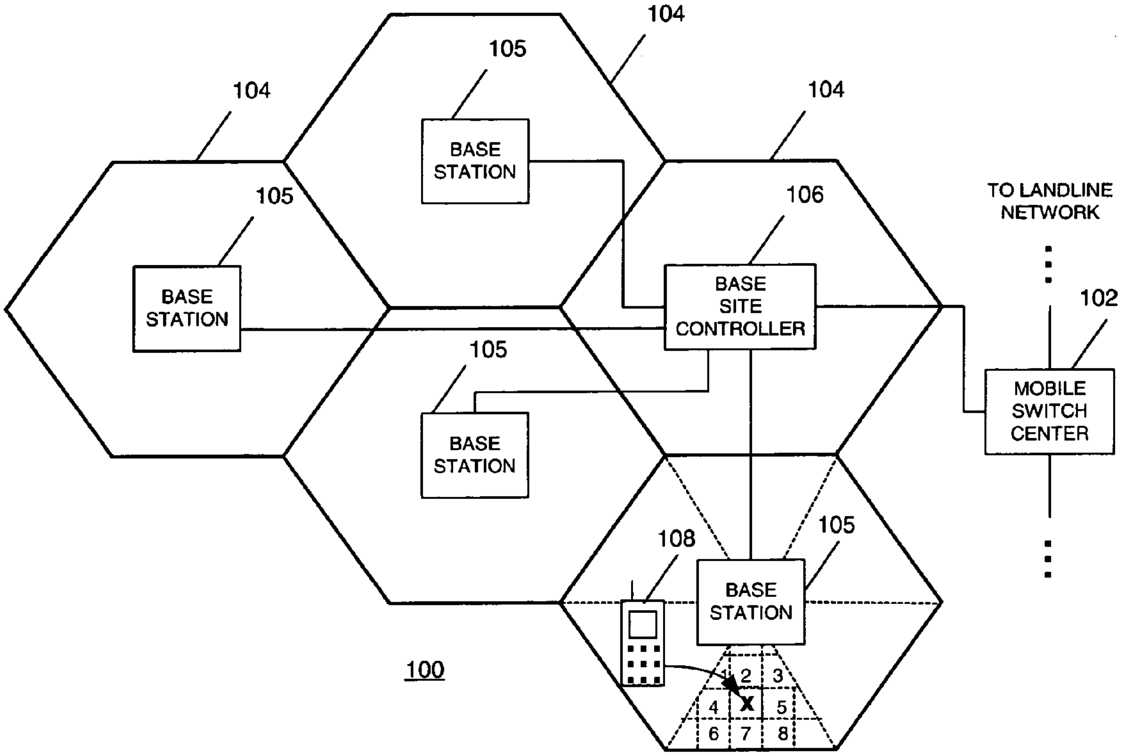
FIG. 1 is a block diagram of a wireless communication network according to the present invention.

Turning first to FIG. 1, a wireless communication network 100 is shown. Wireless communication network 100 preferably includes a mobile switching center 102, a plurality of cell sites 104 each having a base station 105 coupled to a base site controller 106. Finally, a wireless communication device 108 is adapted to communicate with the base stations 105 associated with base site controllers 106 to maintain communications with another wireless communication device or a wireline unit via a landline network. The wireless communication network 100 of the present invention is merely one example of a wireless communication network. It will be understood that other configurations of a wireless communication network could employ the methods and circuits of the present invention.

Figure 2:
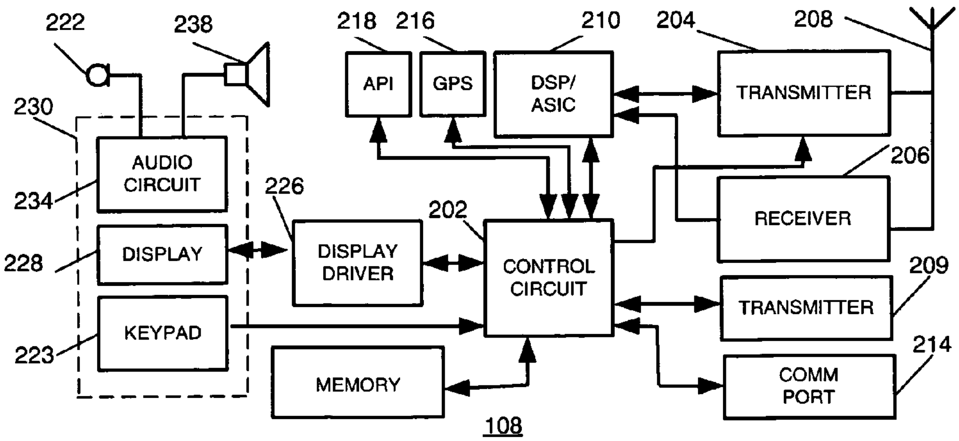
FIG. 2 is a block diagram of a wireless communication device according to the present invention.

Turning now to FIG. 2, a block diagram of the wireless communication device 108 according to the present invention is shown. In particular, a control circuit 202 is coupled to a transmitter 204 and to a receiver 206. The transmitter and receiver are coupled to an antenna 208 for transmitting and receiving RF communication signals, as is well known in the art. A separate transmitter 209 is also optionally coupled to antenna 208. As will be described in more detail, the transmitter 209 could enable communication with a wireless communication network at a lower data rate. The wireless communication device 108 preferably includes a digital signal processor (DSP)/application-specific integrated circuit (ASIC) 210. The DSP/ASIC 210 is coupled to the transmitter 204 and the receiver 206, and is adapted to enable communication of digital signals between the control circuit and the transmitter 204 and the receiver 206. A communication port 214 is also preferably coupled to the control circuit 202 to enable a wired communication link to another device. The communication port 214 could enable communication between the devices by way of any wired communication protocol, such as RS-232, or some proprietary protocol.

A global positioning system (GPS) Unit 216 is preferably coupled to the control circuit 202 to provide location information to the control circuit. That is, the GPS unit 214 can provide the location information related to the location of the Wireless communication device 108, as is well known in the art. Although a GPS unit is shown, any other circuit or software for providing location information of the wireless communication device 108 could be employed according to the present disclosure. For example, triangulation using base stations in a wireless communication network, as is well known in the art, could be used to provide less accurate location information related to the wireless communication device 108. An application program interface (API) 218 is also coupled to the control circuit 202 to provide an application interface, as is well known in the art.

A memory 220 is also preferably coupled to the control circuit. Memory 220 could be incorporated in a single memory device, or a plurality of memory devices, as is well known in the art. In particular, a combination of memory devices, such as a read-only memory (ROM), a random-access memory (RAM), or an EEPROM could be employed, as is well known in the art, depending upon the nature of the information stored in the memory.

A user interface 222 is coupled to the control circuit 102 to enable a user of the wireless communication device 108 to transmit and receive information with a device by way of a communication network. In particular, a keypad 223 is coupled to the control circuit 202 to enable entry of information which can be provided by way of a display driver 226 to a display 228. Finally, the control circuit 202 is also coupled to audio circuitry 234, which includes a microphone 236 and a speaker 238. The wireless communication device 108 as shown in FIG. 1 is merely an exemplary device showing the fundamental features of a wireless communication device employing the features and functions described in the present invention. It will be understood that other wireless communication devices having different elements or different configurations could be employed according to the present invention.

Figure 3:
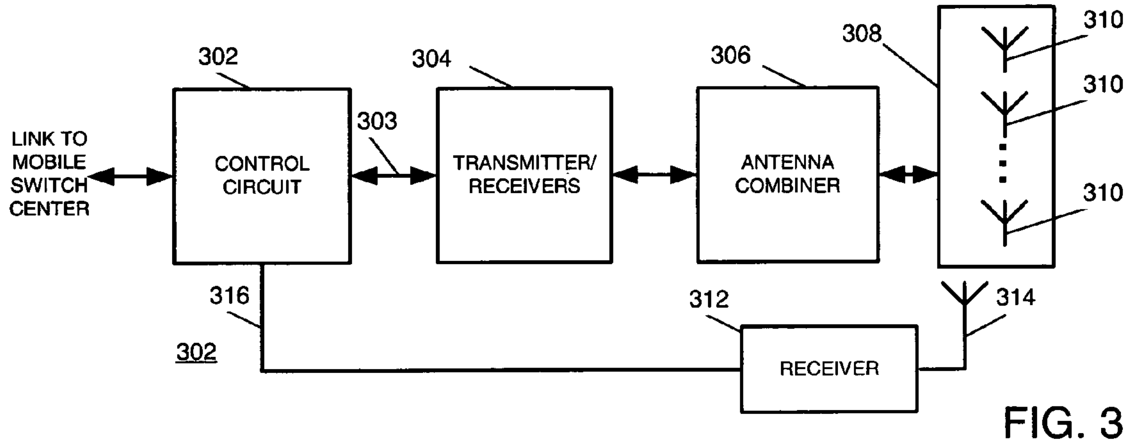
FIG. 3 is a block diagram of a base station of a wireless communication network according to the present invention.

Turning now to FIG. 3, a block diagram of a base station 105 according to the present invention is shown. In particular, a control circuit 302 linked to the mobile switch center 102 controls a transmitter/receiver block 304. An antenna combiner 306 is coupled to an antenna array 308 having a plurality of antenna elements 310. The base station also includes a separate receiver 312 coupled to an antenna 314 to receive location information. As will be described in more detail in more detailed in reference to their remaining figures, the control circuit 302 will control the antenna array 308 to optimize the signal transmitted to or received from the wireless communication device 108 in the wireless communication network 100. Although various elements of the present invention are shown as a part of the base station 105, the elements could also be located or incorporated in other portions of the wireless communication network.

Figure 4:
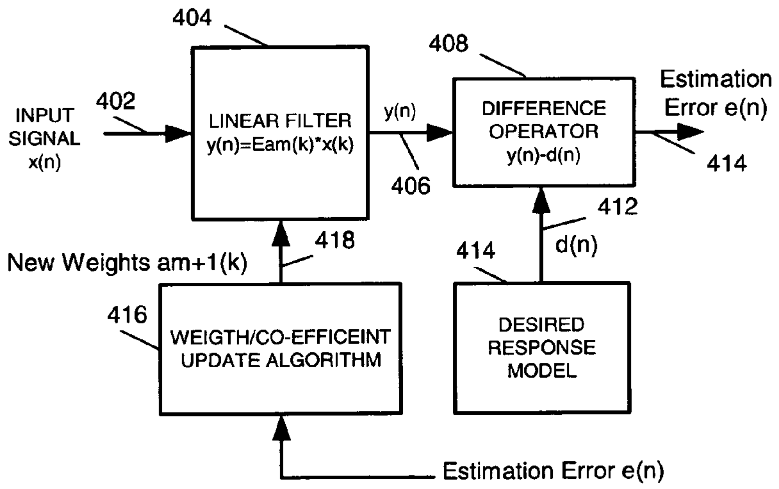
FIG. 4 is a block diagram of a conventional linear adaptive system.

Turning now to FIG. 4, a linear adaptive system for determining antenna weight for an adaptive antenna array is shown. In particular, an input signal x(n) 402 is coupled to a linear filter 404. The linear filter generates an output signal y(n) 406 which is coupled to a different operator 408. An estimation error e(n) 410, which is the difference between the output y(n) and the desired response model d(n), is generated by the different operator. That is the desired signal d(n) 412 is generated by the desired response model and coupled to different operator 408. Finally, antenna weights 412 are provided to the linear filter 404 from the weight/coefficient update algorithm 416. In particular, the weight/coefficient update algorithm 416 receives the error estimate e(n), and adjusts the weights provided to the linear filter 404. Such a linear adaptive system, which must be used continuously in a conventional adaptive array antenna system, can be used according to the present invention to determine the appropriate weights to be stored in the wireless communication network and applied to the antenna array as described in reference to remaining figures.

Figure 5:
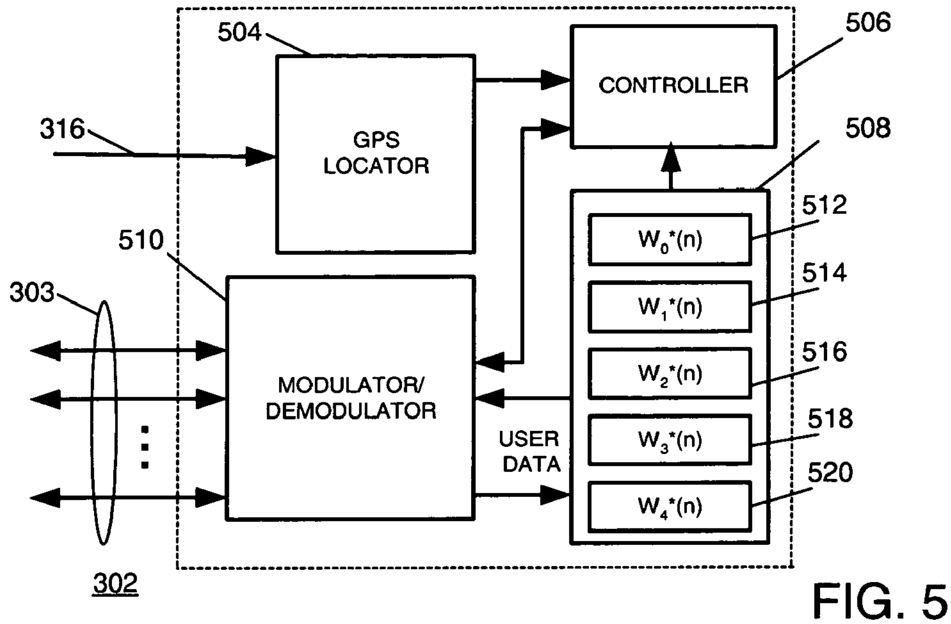
FIG. 5 is a block diagram of a circuit for controlling an antenna system according to the present invention.

Turning now to FIG. 5, a block diagram of the control circuit 302 for controlling an adaptive antenna array according to the present invention is shown. In particular, the control circuit 302 receives signals from the antenna 314 and couples them to a GPS locator 504. The GPS locator 504 enables the wireless communication network to determine the location of a wireless communication device 108. Preferably, the GPS locator would be a wireless communication receiver adapted to receive a low data rate signal such as 10 bits per second. Because the volume of GPS data is low, the GPS data would not need to be sent at the high data rates of the wireless communication network, such as 1 megabit per second.

The GPS data could include, for example, raw GPS data, which then could be processed by the GPS locator to determine the relative location of the wireless communication device. Accordingly, the wireless communication device would not require a separate processor or allocate processing time to demodulate the GPS signals and provide demodulated GPS signals representing the true location of the wireless communication device to the wireless communication network. Alternatively, the wireless communication device could demodulate the GPS signals and provide demodulated GPS information to the wireless communication network.

The GPS locator 504 is coupled to a controller 506. The controller 506 could be, for example, a microprocessor, such as a Power PC microprocessor available from IBM. The controller 506 is coupled to a memory 508 and a modulator/demodulator 510. The modulator/demodulator 510 receives signals from the controller 506 and information, including antenna weights, from the memory 508 to control antenna elements 310 of the antenna array 308. Preferably, the control circuit 302 is incorporated in a single integrated circuit, which could be a field programmable logic device. Alternatively, the elements of the control circuit 302 could be employed in separate integrated circuits where the memory 508 and the modulator/demodulator 510 are field programmable. The memory 508 of the control circuit 502 comprises a plurality of predetermined stored antenna weights 512–520 which are applied to an antenna array as will be described in reference to later figures. The required size of the memory 508, which is preferably a random access memory, would be a function of the number of handsets in the cell, the number of sectors in the cell, the number of antenna weights required, and the number of bits of the antenna weights.

In operation, GPS information, such as raw GPS data or demodulated GPS location information, is preferably provided from the wireless communication device to the control circuit 302 every second. If raw GPS information is provided, the GPS location of the wireless communication device 108 is calculated by the GPS locator 504 or the controller 506. The controller 506 tracks the location of the wireless communication device 108, and addresses the memory 508 and the modulator/demodulator 510 accordingly. That is, the controller 506 directs the modulator/demodulator 510 to apply predetermined antenna weights stored the memory 508 depending upon the location of the wireless communication device. Beam forming, for a switched beam array antenna system, is then performed by the control circuit 302. The operation of the beam forming will be described in more detail and reference to FIG. 6.

The control circuit of the present invention is uniquely suitable for implementation in a field programmable gate array (FPGA), a configurable programmable logic device CPLD, or an application specific integrated circuit (ASIC) because it makes full use of onboard memory for storage of antenna weights. The antenna weights necessary to transmit successfully to each sector are preferably precomputed at the factory and stored in the onboard memory of a FPGA, CPLD or ASIC. However, as will be described in reference to remaining figures, the antenna weights can be updated at a later time, and preferably provided to the wireless communication network from a remote location. The control circuit can be retrofit into existing cellular base stations which have multi-antenna array.

Figure 6:
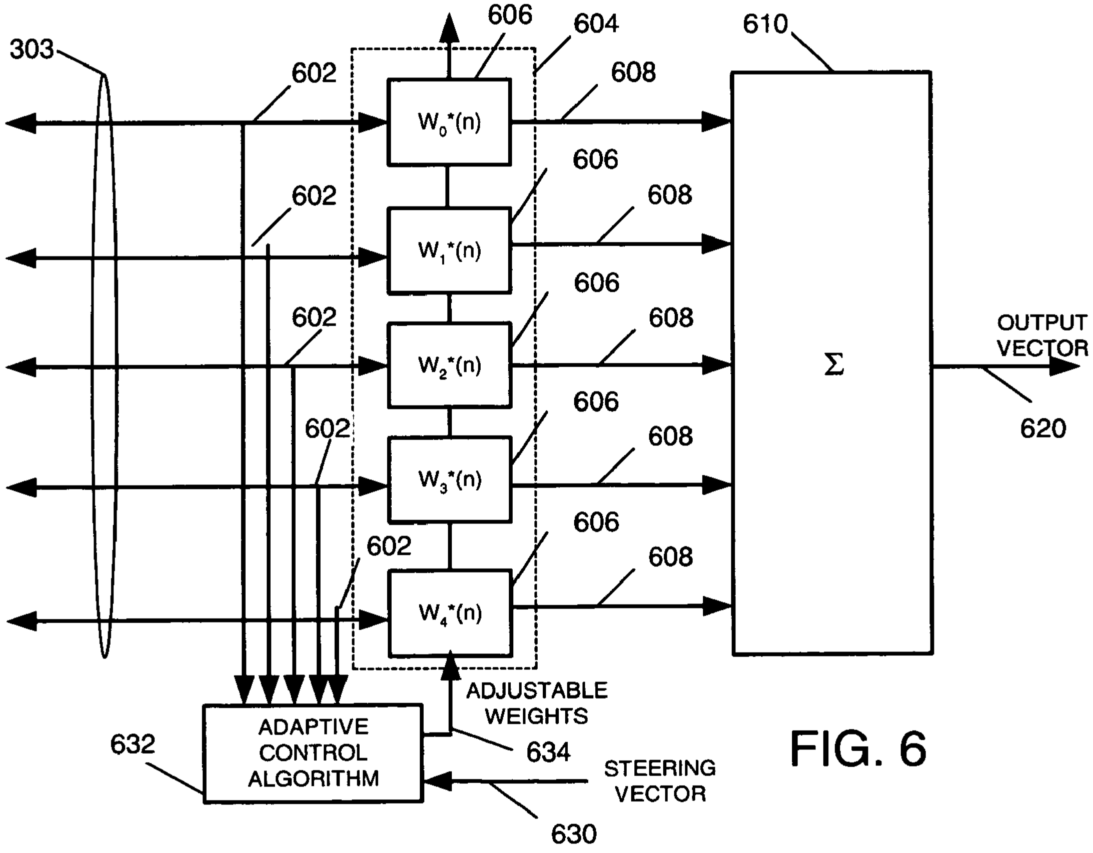
FIG. 6 is a block diagram of an adaptive beam forming array according to the present invention.

Turning now to FIG. 6, an adaptive beam forming array is disclosed. In particular, antenna outputs 602 of the adaptive antenna 308 are coupled to an adjustable weight block 604 having a plurality of adjustable weights 606 corresponding to the antenna outputs 602. The outputs 608 of the adjustable weight block 604 are coupled to a summing circuit 610 which generates an output vector 622. A steering vector 630 is also coupled to a adaptive control algorithm 632. The adaptive control algorithm 532 generates a signal 634 for adjusting the adjustable weights 606. The adaptive control algorithm could be performed by the control circuit 502 of FIG. 5.

As shown in the sectorized cell of FIG. 1, the location of the wireless communication device 108 (designated by the "X" in a sector) is surrounded by eight additional sectors, numbered 1–8. The base station 105 is located in the center of the cell. If the user is moving, there eight potential adjacent sectors to which the user may move, designated with numbers 1–8 in FIG. 1. It is possible for there to more than 8 adjacent sectors if there is multipath reception. As will be described in more detail in reference to the remaining figures, the base station will provide predetermined, stored antenna weights to the antenna array 308 depending upon the location of the wireless communication device 108 in a particular sector, and check the signal strength from adjacent sectors for possible multipath signals.

The system of FIG. 1 implements a switched-beam antenna array that attains most of the performance advantages of an adaptive array using a dramatically simpler control loop. It partitions the coverage area of a antenna array into polar-coordinate sectors designated by a distance of a point in the sector from the base station and an angle, such as an angle from due north. The angular offset between sectors is a function of the angular dispersion of the antenna arrays primary transmit lobe. Preferably, the radial deflection of the transmitted beam should be no more than one half the angular dispersion of the transmit lobe. The radial length R is determined by transmit/receive handshaking between the wireless communication device and the base station. Higher transmit/receive power maps to a longer radial length.

Unlike conventional systems which consider absolute position of a wireless communication device in a network, the present invention quantizes the coverage area into discrete sectors. Although the quantization means that the user may not be precisely in the center of the beam, the sectors can be designed to be of a size that wireless communication device is close enough to beam center for excellent reception. Because there is a known and finite set of sectors, there are also a known and finite set of antenna weight to enable transmission to these sectors. Also, the simplicity of the control loop means that multiple users can readily be supported in a single FPGA, CPLD, or ASIC. The extreme simplicity of the control loop, coupled with the fixed set of antenna weights which do not require adjustment in real-time, allow for multi-user support in a small FPGA or CPLD.

Figure 7:
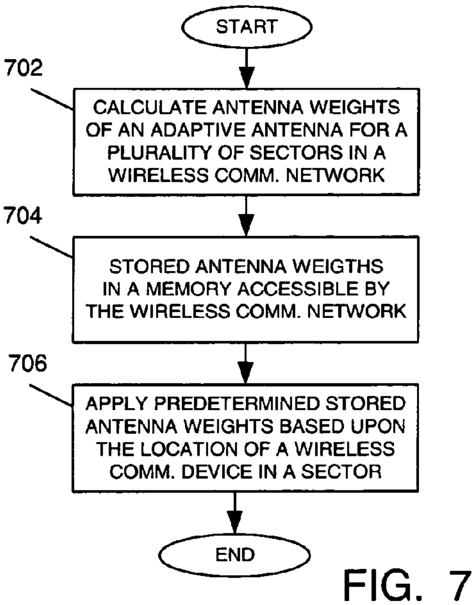
FIG. 7 is a flow chart showing a method of storing antenna weights according to the present invention.

Turning now to FIG. 7, a flow chart shows a method of controlling an adaptive antenna system, such as the antenna system of FIG. 1, according to the present invention. In particular, antenna weights are calculated for an adaptive antenna in a wireless communication network at a step 702. The antenna weights could be calculated using any conventional algorithm for modeling antenna systems, which is well known in the art. The antenna weights for each sector would optimize the transmission of signals to and the receipt of signals from a wireless communication network when the wireless communication device at a predetermined location within the sector of the wireless communication network. For example, the antenna weights could be selected based upon the location of the wireless communication device in the geographic center of the sector. Alternatively, the antenna weights can be chosen based upon the predetermined location other then the geographic center. For example, the predetermined location could be based upon the probability of a wireless communication device being at a certain location within the sector. Alternatively, the antenna weights could be selected based upon some other factor, such as to avoid multipath interference. The calculated antenna weights are stored in a memory accessible by the wireless communication network at a step 704. The antenna weights could be stored, for example, in memory 508 of controller 304. The stored antenna weights are then applied to the adaptive antenna array based upon the location, such as a location of a particular sector, of the wireless communication device 108, at a step 706. The antenna weights could be calculated offline by base station software which is readily available. The weights could also be calculated offline in a simulated RF environment using simulation software, or experimentally by setting up a radio environment or creating a controlled radio environment in a lab.

Figure 8:
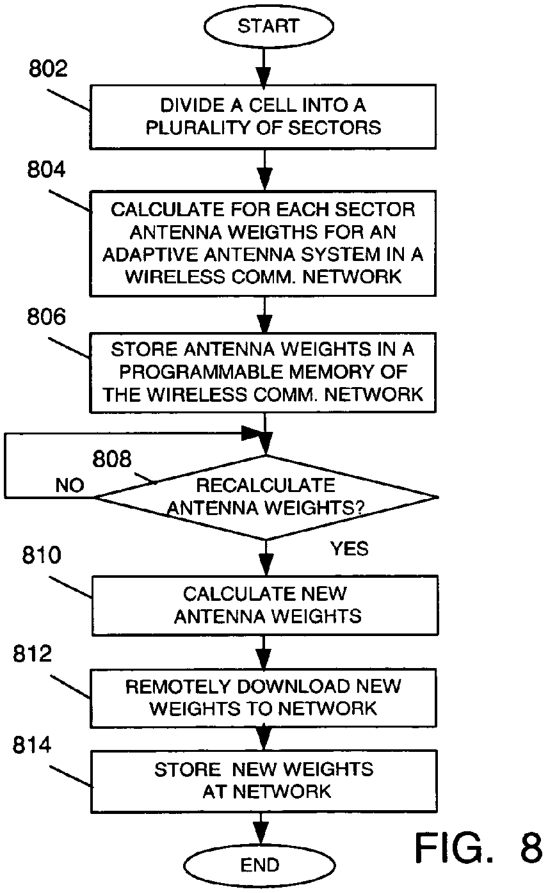
FIG. 8 is a flow chart showing a method of remotely downloading antenna weights according to the present invention.

Turning now to FIG. 8, a method of remotely downloading antenna weights in an adaptive antenna according to an alternate embodiment of the present invention is shown. The method of FIG. 8 could be employed by any wireless communication network, such as the wireless communication network of FIG. 1. The wireless communication network is preferably divided into a plurality of cells, each of which is divided into a plurality of sectors at a step 802. The antenna weights for an adaptive antenna system in a wireless communication network are calculated for each sector at a step 804.

The calculated antenna weights are then stored in the wireless communication network at a step 806. It is then determined whether it is necessary to recalculate the weights at a step 808. The weights may need to be recalculated depending upon changes in physical landscape within the sector, changes in location of base stations within the sector, etc. The new antenna weights are then calculated at a step 810. The new weights are then remotely downloaded to the network at a step 812 and stored at the network at a step 814. The antenna weights could be transmitted by a wired or wireless connection, either directly to the base station or to some other element of the wireless communication device and then transferred to the base station.

Figure 9:
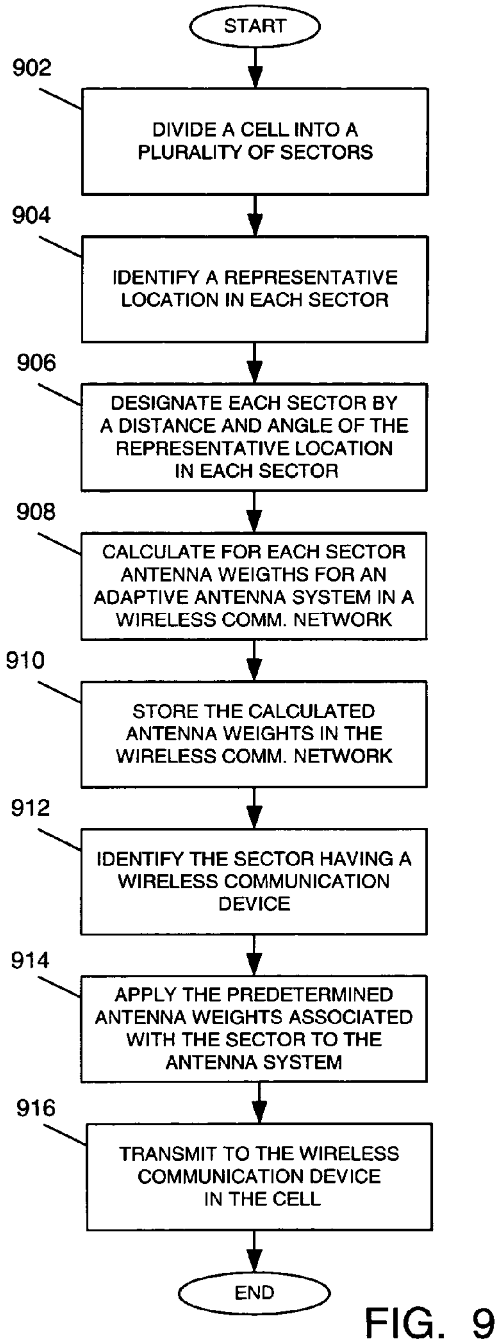
FIG. 9 is a flow chart showing a method of operating a wireless communication network according to the present invention.

Turning now to FIG. 9, a flow chart shows a method of operating a wireless communication network according to the present invention. The method could be performed by any wireless communication network, such as the wireless communication network shown in FIG. 1. Each cell of the wireless communication network is divided into a plurality of sectors at step 902. A representative location in each sector is identified at a step 904. The representative location could be, for example, the center of the sector. Each sector is then designated by a distance from the representative location in each sector to the base station at a step 906. An angle of the representative location, as measured from a predetermined direction such as due north, is also determined. The distance and angle information could be determined in a number of ways, such as using conventional network modeling software or positioning a wireless communication devices at the representative location in the sector and determining its location from GPS data. Antenna weights are then calculated for each sector for an adaptive antenna system in a wireless communication network at a step 908. The antenna weights are selected to optimize communication with a wireless communication device at the representative location within the sector.

The calculated antenna weights are then stored at a location accessible by the wireless communication network at a step 910. The antenna weights could be stored, for example, in a memory of the controller of a base station associated with the cell. The sector having a wireless communication device is then identified at a step 912. The sector is identified by location information provided from the device or derived by the network. The appropriate antenna weights are then applied to the antenna system at a step 914, and the base station communicates with the wireless communication device in the cell at a step 916.

Environmental characterization to analyze multipath may be performed after base station installation. Characterization of the environment, which may be performed using offline processing, can be used to reoptimize beam weights and update. Multipath is easily handled by this invention simply by increasing the number of potential adjacent sectors which are monitored for signal quality to include adjacent sectors. Depending upon the size of the sectors, it may be desirable to check adjacent cells to determine if multipath signals are being received.

Figure 10:
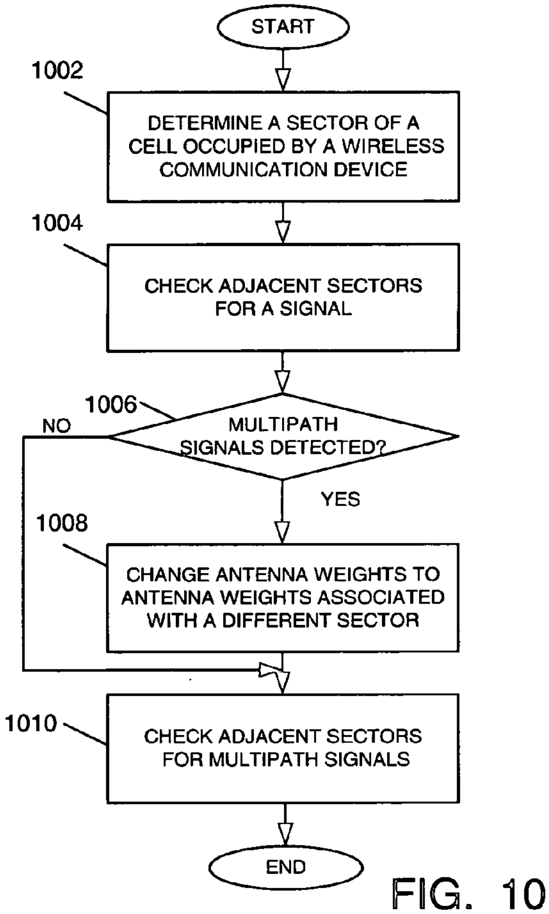
FIG. 10 is a flow chart showing a method of detecting multipath interface according to the present invention.

The flow chart of FIG. 10 shows a method of adjusting for a multipath fading according to the present invention. A base station of a wireless communication network, such as the wireless communication network shown in FIG. 1, determines which sector of a cell is occupied by a wireless communication device at a step 1002. The base station controller then checks adjacent sectors for a signal at a step 1004. The base station controller determines whether multipath signals are detected at a step 1006. The base station then changes the antenna weights a necessary depending upon the received signals at a step 1008, and stores the new antenna weights at a step 1010.

Figure 11:
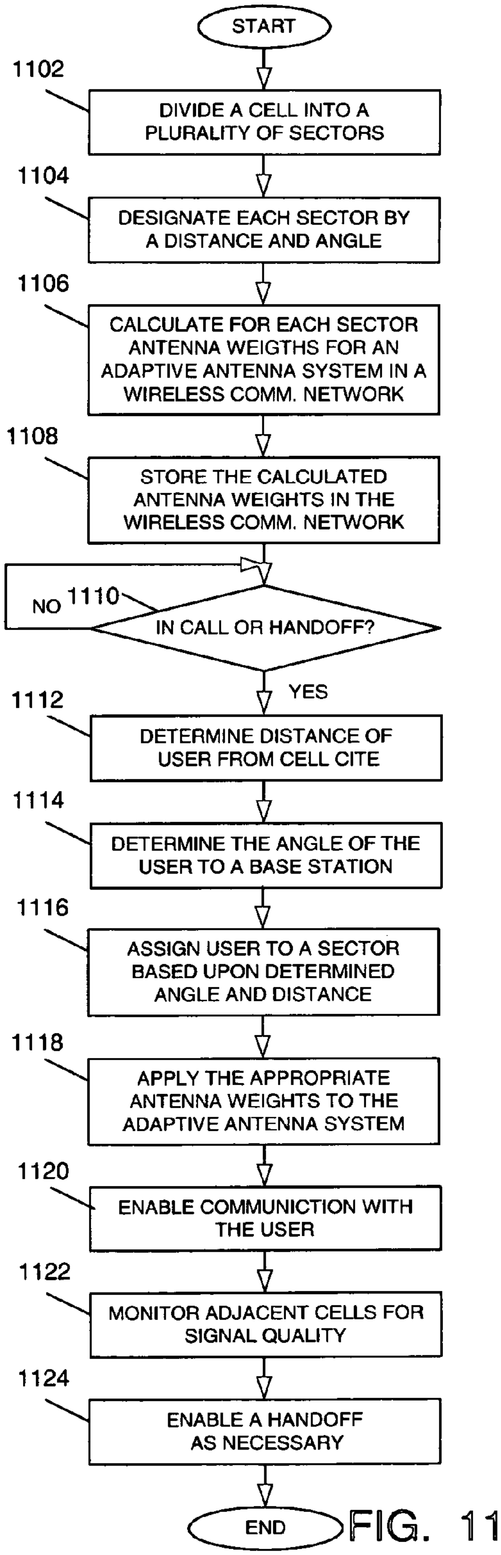
FIG. 11 is a flow chart showing a detailed method of operating a wireless communication network according to the present invention.

Turning now to FIG. 11, a flow chart shows a method of operating a wireless communication network having an adaptive antenna array according to the present invention. The method could be performed on any wireless communication network, such as the wireless communication network of FIG. 1. The cells of the wireless communication network are divided into a plurality of sectors at a step 1102. Each sector is designated by a distance and an angle at a step 1104. Antenna waves are calculated for each sector for the adaptive antenna system in the wireless communication network at a step 1106. The calculated antenna waves are stored in the wireless communication network at a step 1108.

It is then determined whether a wireless communication device is in a call at a step 1110. The base station then determines a distance location of user from the cell at a step 1112. The base station also determines an angle location of the user to the base station at a step 1114. The distance and angle can be determined by a number of means, such as GPS information provided by the wireless communication device, triangulation using a plurality of base stations as is well known in the art, or other suitable means. The base station then assigns the user to a sector based upon the determined distance and angle locations at a step 1116. The appropriate antenna weights associated with the assigned sectors (i.e. based upon the representative location of the sector) are then applied to the adaptive antenna system at a step 1118. Communication is then enabled with the user at a step 1120. The base station also monitors adjacent cells for signal quality at a step 1122, and enables a handoff as necessary at a step 1124.

It can therefore be appreciated that the new and novel method and apparatus for controlling an antenna system has been described. The reduction of components in the antenna array system, and the increased transparency of the antenna algorithm, will allow more rapid development of lower cost antenna systems. It will be appreciated by those skilled in the art that, given the teaching herein, numerous alternatives and equivalents will be seen to exist which incorporate the disclosed invention. As a result, the invention is not to be limited by the foregoing embodiments, but only by the following claims.

The invention claimed is:

1. A method of controlling an antenna system of a wireless communication network having a plurality of cells, said method comprising the steps of:

determining antenna weights of an antenna array to enable communication between a base station within a sector of said wireless communication network and said wireless communication device within said wireless communication network;

storing said antenna weights in a remotely programmable memory associated with said base station of said wireless communication network;

programming a modulator/demodulator in programmable logic of a programmable logic device of said base station;

applying predetermined stored antenna weights to said antenna array of said base station based upon a location of said wireless communication device;

detecting multi-path interference within said sector of said wireless communication network;

recalculating antenna weights for said sector based upon said multi-path interference within said sector of said wireless communication network;

remotely downloading said recalculated antenna weights to said base station of said wireless communication network;

updating said antenna weights stored in said remotely programmable memory with said recalculated weights; and enabling reprogramming said modulator/demodulator in said programmable logic of said programmable logic device.

2. The method of claim 1 further comprising a step of dividing a cell of said wireless communication network accessible by said antenna system into a plurality of sectors.

3. The method of claim 1 further comprising a step of designating each sector by a distance location from a base station and an angle location.

4. The method of claim 3 further comprising a step of calculating for each sector a set of antenna weights.

5. The method of claim 1 wherein said step of storing said antenna weights in a remotely programmable memory comprises storing said antenna weights in a memory associated with a programmable logic device.

6. The method of claim 1 further comprising a step of determining a distance location of said wireless communication device from a base station in said wireless communication network.

7. The method of claim 6 further comprising a step of determining an angle location of said wireless communication device.

8. The method of claim 7 further comprising a step of assigning said wireless communication device to a sector based upon a determined distance location and angle location.

9. The method of claim 8 further comprising a step of applying predetermined antenna weights to said antenna array.

10. The method of claim 9 wherein said predetermined antenna weights are associated with said sector.

11. The method of claim 10 further comprising a step of enabling communication between the wireless communication device and the wireless communication network.

12. The method of claim 1 further comprising a step of monitoring adjacent cells for signal quality.

13. The method of claim 12 further comprising a step of enabling a handoff.

14. The method of claim 13 further comprising a step of applying a new set of antenna weights after said handoff.

15. A method of controlling an antenna system of a wireless communication network having a plurality of cells, said method comprising the steps of:

dividing each cell of said plurality of cells into a plurality of sectors;

determining antenna weights of an antenna array to enable communication between a base station within a sector of said wireless communication network and a wireless communication device within each sector of said plurality of sectors;

storing said antenna weights in a remotely programmable memory associated with said base station of said wireless communication network;

programming a modulator/demodulator in programmable logic of a programmable logic device of said base station;

determining a location of a wireless communication device in said wireless communication network;

applying predetermined antenna weights to said antenna array based upon said location of said wireless communication device;

detecting multi-path interference within said sector of said wireless communication network;

recalculating antenna weights for said sector based upon said multi-path interference within said sector of said wireless communication network;

remotely downloading said recalculated antenna weights to said base station of said wireless communication network;

updating said antenna weights stored in said remotely programmable memory with said recalculated antenna weights; and enabling reprogramming said modulator/demodulator in said programmable logic of said programmable logic device.

16. A method of controlling an antenna system of a wireless communication network having a plurality of cells, said method comprising the steps of:

determining antenna weights to apply to an antenna array of said antenna system when a wireless communication device is within a cell of said plurality of cells;

providing antenna weights to a base station within a sector of said wireless communication network from a location remote from said base station;

storing said antenna weights in a remotely programmable memory of said base station of said wireless communication network;

programming a modulator/demodulator in programmable logic of a programmable logic device of said base station;

detecting multi-path interference within said sector of said wireless communication network;

recalculating antenna weights for said sector based upon said multi-path interference within said sector of said wireless communication network;

remotely downloading said recalculated antenna weights to said base station of said wireless communication network;

updating said antenna weights stored in said remotely programmable memory with said recalculated antenna weights; and enabling reprogramming said modulator/demodulator in said programmable logic of said programmable logic device.

17. The method of claim 16 further comprising a step of dividing a cell of said wireless communication network accessible by said antenna system into a plurality of sectors.

18. The method of claim 17 further comprising a step of designating each sector by a distance location from said base station and angle location.

19. The method of claim 18 further comprising a step of determining a distance location of said wireless communication device to said base station.

20. The method of claim 19 further comprising a step of determining an angle location of said wireless communication device.

21. The method of claim 20 further comprising a step of assigning said wireless communication device to a sector based upon a determined distance and angle.

22. The method of claim 21 further comprising a step of applying predetermined antenna weights to an antenna array of said base station.

23. The method of claim 22 further comprising a step of enabling communication between the wireless communication device and the wireless communication network.

24. A method of controlling an antenna system of a wireless communication network having a plurality of cells, said method comprising the steps of:

dividing a cell of said wireless communication network into a plurality of sectors;

determining a sector within said cell occupied by said wireless communication device;

determining antenna weights to apply to an antenna array when said wireless communication device is within said sector;

providing antenna weights to a base station of said wireless communication network from a location remote from said base station;

storing said antenna weights in a remotely programmable memory of said base station of said wireless communication network;

programming a modulator/demodulator in programmable logic of a programmable logic device of said base station;

detecting multi-path interference within said sector of said wireless communication network;

recalculating antenna weights for said sector based upon said multi-path interference within said sector of said wireless communication network;

remotely downloading said recalculated antenna weights to said base station of said wireless communication network;

updating said antenna weights stored in said remotely programmable memory with said recalculated antenna weights; and enabling reprogramming said modulator/demodulator in said programmable logic of said programmable logic device.

25. A method of controlling an antenna system of a wireless communication network having a plurality of cells, said method comprising the steps of:

dividing a cell of said wireless communication network into a plurality of sectors;

storing antenna weights associated with each sector of said plurality of sectors in a remotely programmable memory of a base station of said wireless communication network;

programming a modulator/demodulator in programmable logic of a programmable logic device of said base station;

determining a sector within which a wireless communication device is located;

providing predetermined antenna weights to an antenna array of said antenna system of said base station depending upon said sector within which said wireless communication device is located;

detecting multi-path interference within said sector of said wireless communication network;

recalculating antenna weights for said sector based upon said multi-path interference within said sector of said wireless communication network;

remotely downloading said recalculated antenna weights to said base station of said wireless communication network;

updating said antenna weights stored in said remotely programmable memory with said recalculated antenna weights; and enabling reprogramming said modulator/demodulator in said programmable logic of said programmable logic device.

26. The method of claim 25 further comprising a step of designating each sector by a distance location from a base station and an angle location.

27. The method of claim 26 further comprising a step of determining a distance location of a wireless communication device from a base station.

28. The method of claim 27 further comprising a step of determining an angle location of said wireless communication device.

29. The method of claim 28 further comprising a step of assigning said wireless communication device to a sector based upon a determined distance location and angle location.

30. The method of claim 29 further comprising a step of applying predetermined antenna weights to said antenna system.

31. The method of claim 30 further comprising a step of applying a new set of predetermined antenna weights after a hand off.

32. A circuit for controlling an antenna system, said circuit comprising:

an antenna array;

a controller associated with a base station of a wireless communication network and coupled to said antenna array, said controller detecting multi-path interference within a sector of a plurality of sectors of said wireless communication network;

a programmable memory coupled to said controller, said programmable memory storing antenna weights associated with a plurality of sectors of a wireless communication network, said programmable memory storing recalculated antenna weights received from a remote location and based upon said multi-path interference detected within a sector of said plurality of sectors;

a location circuit coupled to said control circuit, said location circuit receiving location information from a wireless communication device; and a modulator/demodulator coupled to said programmable memory and receiving antenna weights, said modulator/demodulator implemented in programmable logic of a programmable logic device, wherein said modulator/demodulator is able to be reprogrammed by way of said programmable logic of said programmable logic device.

33. The circuit of claim 32 wherein said control circuit comprises a microprocessor.

34. The circuit of claim 32 wherein said location circuit comprises a separate receiver.

35. The circuit of claim 34 further comprising an antenna coupled to said receiver for receiving said location information from a wireless communication device.

36. The circuit of claim 32 wherein said location information is transmitted at a first data rate.

37. The circuit of claim 36 wherein said antenna array receives communication signals at a second data rate.

38. The apparatus of claim 32 wherein said circuit is incorporated in a single integrated circuit.

39. A circuit for controlling an antenna system, said circuit comprising:

a control circuit associated with a base station of a wireless communication network, said control circuit detecting multi-path interference within a sector of a plurality of sectors of said wireless communication network;

a programmable memory coupled to said control circuit, said programmable memory storing said antenna weights associated with said plurality of sectors, said programmable memory storing recalculated antenna weights received from a remote location and based upon said multi-path interference detected within a sector of said plurality of sectors;

a location circuit coupled to said control circuit, said location circuit having first receiver for receiving location information from a wireless communication device;

an antenna array coupled to said control circuit and receiving communication signals; and a modulator/demodulator coupled to said antenna array and applying said antenna weights, said modulator/demodulator implemented in programmable logic of a programmable logic device, wherein said modulator/demodulator is able to be reprogrammed by way of said programmable logic of said programmable logic device.

40. A wireless communication network having an adaptive antenna system, said wireless communication network comprising:

an antenna array;

a base station controller coupled to said antenna array, said base station controller detecting multi-path interference within a sector of a plurality of sectors of said wireless communication network;

a remotely programmable memory associated with a base station, said remotely programmable memory storing antenna weights associated with a plurality of sectors;

a modulator/demodulator implemented in programmable logic of a programmable logic device of said base station, wherein said modulator/demodulator is able to be reprogrammed by way of said programmable logic of said programmable logic device; and a communication link coupled to said remotely programmable memory, said communication link enabling the transfer of recalculated antenna weights from a remote location to be stored in said remotely programmable memory, said recalculated antenna weights being based upon said multi-path interference detected within a sector of said plurality of sectors.

41. The wireless communication network of claim 40 wherein said antenna array receives communication signals at a first data rate.

42. The wireless communication network of claim 40 wherein said remotely programmable memory is incorporated in a programmable logic array.

43. The wireless communication network of claim 40 further comprising a second antenna.

44. The wireless communication network of claim 43 further comprising a location circuit coupled to said second antenna.

45. The wireless communication network of claim 44 wherein said second antenna is adapted to receive location data at a second data rate.

* * * * *